(12) United States Patent
Violette et al.

(10) Patent No.: US 6,213,719 B1
(45) Date of Patent: Apr. 10, 2001

(54) BAR WEDGE PRELOAD APPARATUS FOR A PROPELLER BLADE

(75) Inventors: John A. Violette, Granby; Coleman D. Shattuck, Colchester, both of CT (US); David P. Nagle, Westfield, MA (US)

(73) Assignee: United Technologies Corporation, Windsor Locks, CT (US)

( * ) Notice: Subject to any disclaimer, the term of this patent is extended or adjusted under 35 U.S.C. 154(b) by 0 days.

(21) Appl. No.: 09/362,605

(22) Filed: Jul. 28, 1999

(51) Int. Cl.[7] ............................. F01D 5/30; B64C 11/06
(52) U.S. Cl. .................. 416/205; 416/204 A; 416/220 R
(58) Field of Search ........................ 416/205, 219 R, 416/220 R, 204 A, 204 R, 212 R, 210 A, 209, 206, 208, 214 A, 207, 214 R, 230

(56) References Cited

U.S. PATENT DOCUMENTS

| | | | |
|---|---|---|---|
| 2,980,395 | * 4/1961 | Rubbra et al. | 416/205 |
| 4,850,801 | 7/1989 | Valentine | 416/205 |
| 4,877,376 | 10/1989 | Sikorski et al. | 416/207 |
| 5,022,824 | 6/1991 | Violette et al. | 416/230 |
| 5,118,256 | 6/1992 | Violette et al. | 416/134 |
| 5,163,817 | 11/1992 | Violette et al. | 416/204 |

* cited by examiner

*Primary Examiner*—Christopher Verdier
*Assistant Examiner*—Richard Woo

(57) ABSTRACT

A composite propeller blade and hub attachment assembly is disclosed. The assembly includes a blade root having a first connecting member and a hub arm having a second connecting member. The first connecting member meshingly engages the second connecting member. A device preloads the blade root and the hub arm. The first and second connecting members form a slot for receiving the preloading device. The preloading device includes an outer movable unit, an inner movable unit, and a mechanism for displacing the outer and inner movable units relative each other. As the mechanism for displacing relatively moves the inner and outer units, the preloading device is caused to expand and tension the blade root and hub arm for mechanically preloading the blade, in a manner which increases the low centrifugal load off lightweight composite blades.

25 Claims, 5 Drawing Sheets

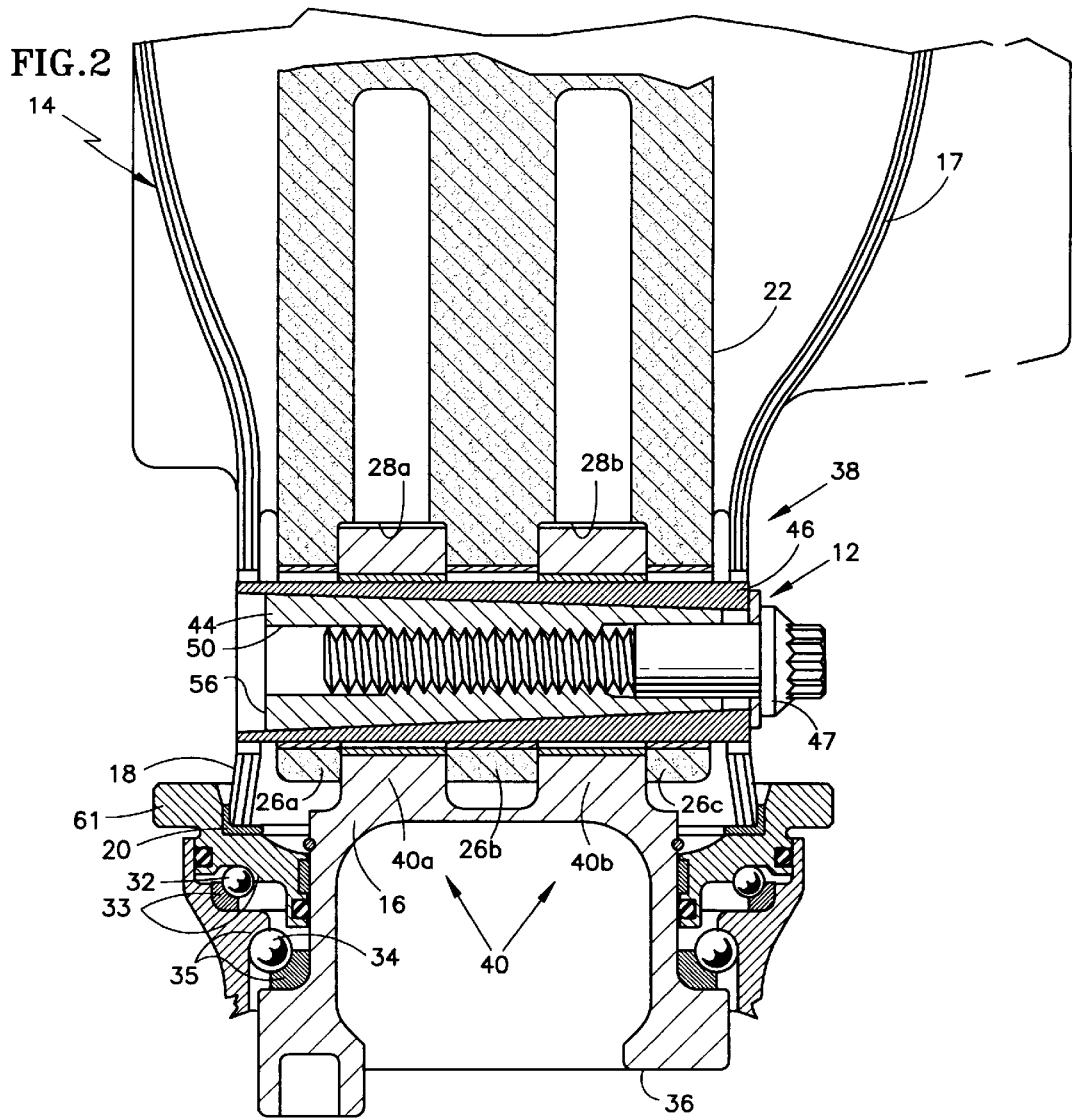
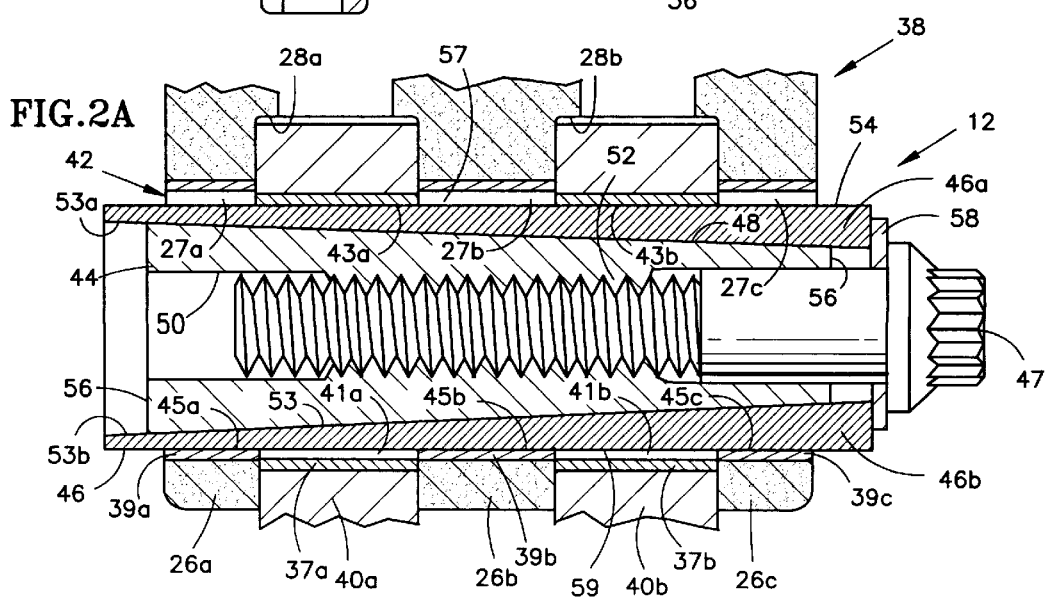

FIG. 4
FIG. 4A
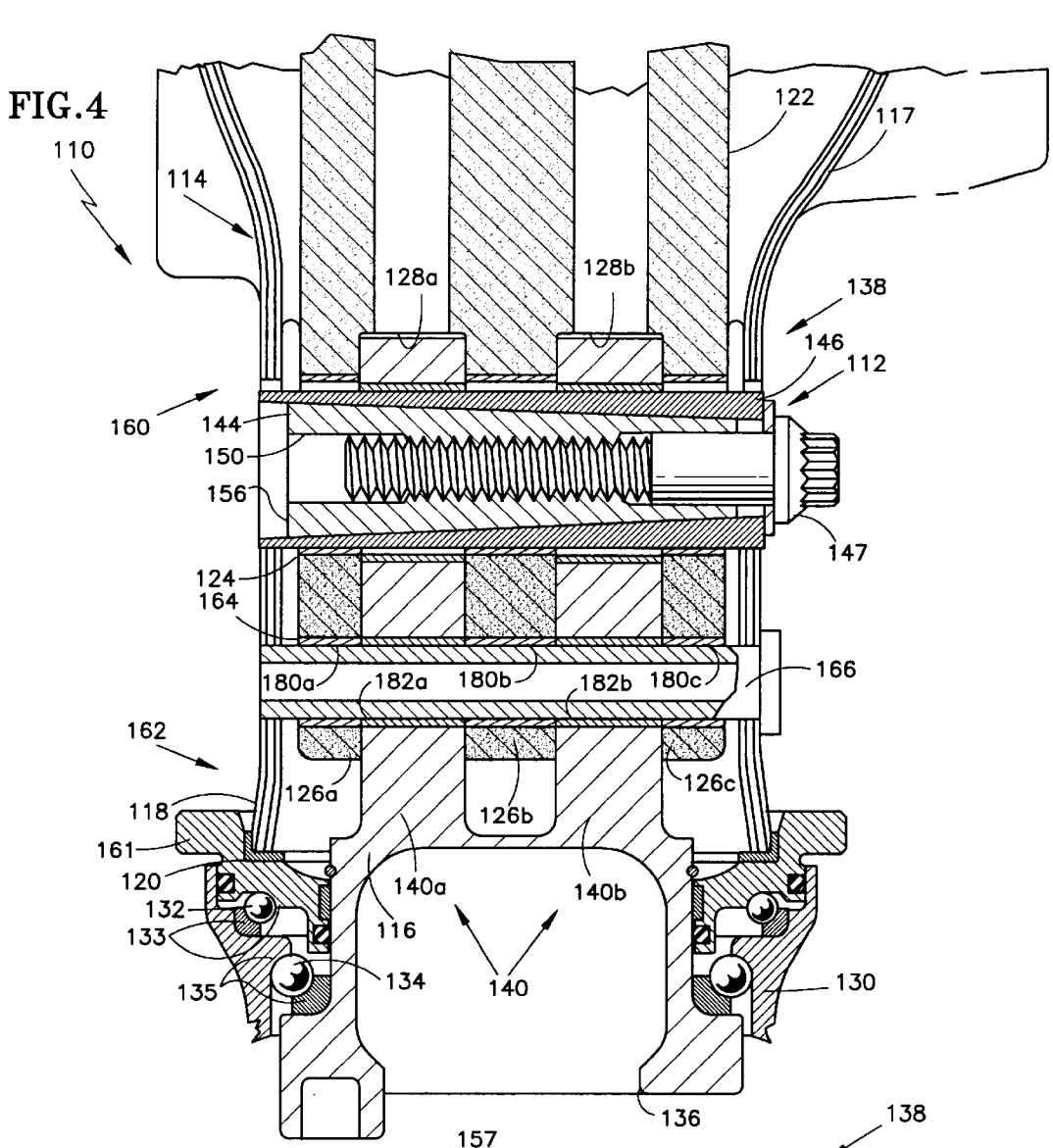
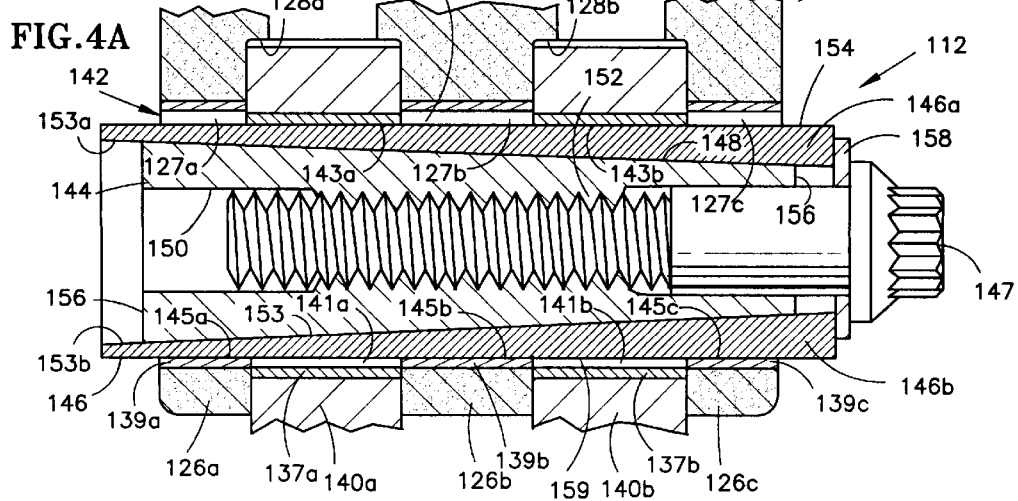

BAR WEDGE PRELOAD APPARATUS FOR A PROPELLER BLADE

TECHNICAL FIELD

This invention is directed to preloading propeller blade bearings of aircraft in preparation for centrifugal and bending forces which develop during operation, and more particularly, to a bar wedge preload and retention device.

BACKGROUND ART

With the invent of the composite propeller blade, which are lighter than the earlier metal and/or metal-composite hybrids, blades in operation experience reduced centrifugal loading. Accordingly, the loading is typically insufficient to prevent rocking caused by high bending loads. Many current designs use a retention assembly that includes one or more bearings that must be preloaded by some means. The rocking effect caused by the bending loads is alleviated in many current designs by use of pitch change bearings with increased diameters. Often, these designs also use extra rows of bearings. However, these additions add to the weight and complexity of the blade and retention assembly design, thereby increasing costs and potential for mechanical failure. In addition, many composite propeller blades attach through a shear bond joint to a metal retention member. This is an inefficient means for load transfer and requires a secondary mechanical backup.

As indicated, the existing solution to prevent rocking is to use a preloaded bearing assembly so as to provide a compensating load. For example, the double row bearing design, used by the assignee of the present application, is preloaded by a large mechanical nut through a very stiff load path, making the application of preloading somewhat difficult. In addition, it is difficult to monitor and retain the initial preload over long periods of service time. Also, current designs require the use of special tools to apply the high preload necessary. And, some form of load monitoring is required to prevent the loss of foundation/attachment stiffness at the base of the blade. Without such monitoring and means for adjusting the preload, a potentially dangerous change in blade resonant frequency can arise undetected. And, since the most current designs use a mechanical nut, small amounts of fretting or wear on the threads that engage the nut can lead to this loss of stiffness. In addition to the above, replacement of blades with these types of retention designs is cumbersome and requires a significant amount of time. U.S. Pat. Nos. 4,850,801 to Valentine and 5,118, 256 to Violette et al, both assigned to the assignee of the present application, provide examples of such designs.

Blade retention may also be achieved by using a pin assembly at the base of the blade for attaching the same to a receiver portion attached to the hub of the propeller assembly. A plurality of patents has issued with respect to such designs. Examples of such designs are shown in U.S. Pat. No. 5,163,817 to Violette et al, U.S. Pat. No. 5,02,824 to Violette et al and U.S. Pat. No. 4,877,376 to Sikorsky et al.

Sikorsky et al is particularly interesting and describes a method of attachment of a rotor blade of fiber reinforced plastic to a metal rotor hub. The shank of the propeller blade attaches to the hub through a connection. Prestress can be applied through the connection to the propeller to assist in resistance of lateral impact force. In this design, the blade 4 connects to a tubular body B of the hub by means of bolts or screws. In addition, the blade includes a tubular shank 18b that extends into the tubular body and which further connects to the tubular body via an attachment or tensioning means 5b. The tensioning means 5b comprises a tensioning bolt 21 rotatably arranged in a transverse bore in shank 18b. The tensioning bolt includes pivot pins 22 and 23 extending from each end thereof and which are eccentric to the centerline of the bolt. Each pivot pin 22 and 23 resides in a support disk 25 and 26, respectively, which mount in circumferential slots 27 and 28, respectively, in the wall of tubular body 8b. When turning the tensioning bolt 21 via head 24 of pin 23, support disks 25 and 26 travel in slots 27 and 28. By this process, tension is applied to shank 19 in a direction of arrow 29 to press the blade against an upper flange of body 8b. This tensioning produces a prestress in the blade 4 that opposes stresses developed in the blade due to lateral impact forces during operations. While a cam or a center pin design is used to apply the downward force to the shank 18b, no locking mechanism is provided for maintaining the prestress on the shank. This shortcoming could potentially allow loss of the prestress and/or require that the bolts 6 maintain the prestress, which may also give rise to a prestress loss by their loosening.

An alternative embodiment is shown in FIG. 4 and in this embodiment, a retaining pin 32 resides in a transverse opening 31 in shank 18c. The pin includes end portions received in holes 34a and 34b in a tension sleeve 33 that surrounds shank 18c. The tension sleeve includes two spirally ascending semi-annular cam faces 35 and 36 that inversely conform to cam faces on an additional coaxially arranged rotary sleeve 37. The tension sleeve and rotary sleeve are arranged one above the other for axial displacement in the tubular body 8c. Tubular body 8c includes circumferential slots 38a and 38b to permit access to positioning holes 39a and 39b in the rotor sleeve 37. A tool, not shown, may be used to engage the positioning holes 39a and 39b such that the rotary sleeve 37 is rotatable to tension the shank 18c. Similar to the embodiment discussed above, there appears to be no means for locking the prestress position of rotary sleeve 37 and tension sleeve 33 to ensure maintenance of the preload. Again, the design uses bolts 36 to lock the preload position into place, which as discussed above, presents questionable preload security.

There exists a need, therefore, for an improved pin type retention and preload assembly for retaining a propeller blade to a hub and for preloading the same, whereby the preload position of the blade relative the hub is locked into place.

DISCLOSURE OF THE INVENTION

The primary object of this invention is to provide an improved pin type preload and retention assembly for retaining a propeller blade to a hub.

Another object of this invention is to provide a bar wedge preload and retention assembly for simultaneously preloading and retaining the blade to a receiving portion of a propeller hub without the use of additional fastening means.

Still another object of this invention is to provide an improved preload and retention assembly which uses a bar wedge tool in combination with a pinned retention device, wherein the bar wedge tool may be removed from the propeller blade assembly after the preload is applied thereby and the pinned retention device is secured.

The foregoing objects and following advantages are achieved by the composite propeller blade and hub attachment assembly of the present invention. The assembly includes a blade root having a first connecting member and a hub arm having a second connecting member. The first connecting member meshingly engages the second connecting member. A device preloads the blade root and the hub arm. The first and second connecting members form a slot for receiving the preloading device. The preloading device includes an outer movable unit, an inner movable unit, and a mechanism for displacing the outer and inner movable units relative each other. As the mechanism for displacing relatively moves the inner and outer units, the preloading device is caused to expand and tension the blade root and hub arm for centrifugally preloading the blade.

BRIEF DESCRIPTION OF THE DRAWINGS

FIG. 2 is a cross-sectional view taken along line 2—2 of FIG. 1;

FIG. 2A is a partial expanded cross-sectional view taken along line 2—2 of FIG. 1;

FIG. 4 is a cross-sectional view taken along line 4—4 of FIG 3;

FIG. 4A is a partial expanded cross-sectional view taken along line 4—4 of FIG. 3.

BEST MODE FOR CARRYING OUT THE INVENTION

Figure 1:
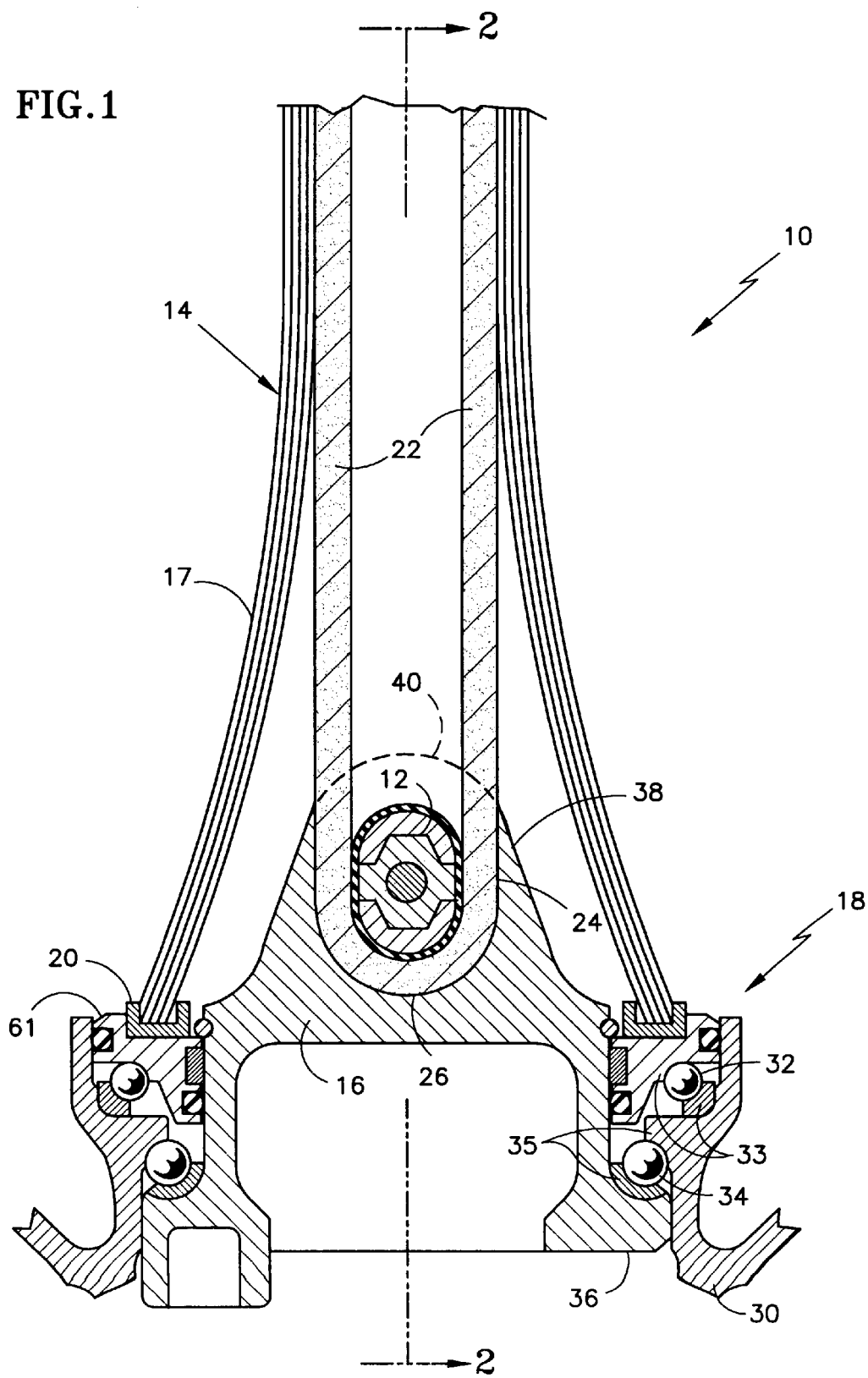
FIG. 1 is an elevational cross-sectional view of the bar wedge preload and retention assembly of the present invention.

Referring now to the drawings in detail, shown in FIG. 1 is an elevational view of a propeller blade installed on a propeller blade arm. The blade uses the bar wedge preload and retention assembly according to the principles of the present invention, which is designated generally as 10. Assembly 10 generally includes bar wedge device 12, blade 14, and receiver 16.

Blade 14 includes a graphite and/or KEVLAR® and/or glass fiber reinforced composite shell 17 forming the outer surface and airfoil contour of the blade. Blade 14 includes a tip (not shown) and a blade root 18 that engages flange 20 on bearing spacer 61, between the outside diameter of the receiver and the inside diameter of the hub area. Blade 14 further includes a graphite spar 22 forming the interior portion of the blade. The spar, at the root end 24, has a plurality of longitudinal tenons 26, preferably three, shown more clearly as elements 26a, 26b and 26c in FIG. 2. Tenons 26, separated via spaces 28, have a set of openings 27a–27c therein and mesh with mating tenons 40a–b, to be discussed in more detail below, extending from receiver 16.

As shown in FIGS. 1, 2 and 2A, receiver 16 is rotatably retained in hub arm 30 via a plurality of bearing assemblies 32 and 34 which ride in bearing races 33 and 35, substantially as known in the art. Accordingly, the inboard end 36 of receiver 16 extends into hub arm 30 while the outboard end 38 of receiver 16 extends out of hub arm 30. As indicated above, the outboard end 38 of the receiver includes a plurality of longitudinal tenons 40, shown specifically as tenons 40a and 40b in FIGS. 2 and [@000a]. Tenons 40 have two openings 41a, 41b therein. Tenons 40 meshingly engage in spaces 28 with tenons 26a–26c of blade 14. As shown in FIGS. 1, 2 and 2A, set of openings 27a–27c of tenons 26a–26c and set of openings 41a–41b of tenons 40a–40b form an elongated opening or slot 42 for receiving bar wedge device 12. All openings may be modified to incorporate low friction bushings 39a–c in tenons 26a–c and low friction bushings 37a–b in tenons 40a–b to prevent metal to metal wear.

As shown in FIGS. 2 and 2A, the bar wedge device 12, in assembly, is inserted in opening 42 across all of the tenons. Bar wedge device 12 includes an inner wedge 44, outer wedge receptors 46a–b and a tensioning member 47, preferably a bolt. Inner wedge 44 has a tapered shaped outside wall 48 and a circular inner wall 50. Tapered outside wall 48 is sloped inwardly from left to right, as shown in FIGS. 2 and 2A. The circular inner wall 50 includes a female threaded portion 52 for engaging tensioning member or bolt 47. Outer receptors 46a–b includes an inside surfaces 53a–b sloped at the same angle of the outside wall 48 of the inner wedge 44. The outer wall 54 of the wedge receptor 46 is substantially circular in shape for the width of the propeller blade root 18. As shown in FIGS. 2 and 2A, the length of the inner wedge 44 is less than the length of wedge receptors 46a–b. Accordingly, with inner wedge 44 inside wedge receptors 46a–b, the ends 56 of the inner wedge 44 do not extend outside the width of the blade root 18. Having the shorter length, inner wedge 44 is movable inside of wedge receptor 46.

In assembly, bar wedge device 12, with inner wedge 44 inserted snugly in wedge receptor 46, extends in opening 42 formed by tenons 26 and 40 of the blade 14 and receiver 16, respectively. Due to the overall geometrical design of the assembly, the outboard surfaces 43a–b of bushings 37a–b of tenons 40a and 40b, are positioned nearer bar wedge device 12 on the outboard side 57 of opening 42. The inboard surface 45a–c, of bushings 39a–c of tenons 26a–26c, are positioned nearer bar wedge device 12 on the inboard side 59 of opening 42. Tensioning member 47 engages the threaded portion 52 of circular wall 50, and has a washer 58 between the head of bolt 47 and bar wedge receptors 46a–b.

In operation, bolt 47 tightens into threaded portion 52 of the circular wall 50 and inner wedge 44 draws further into wedge receptors 46a–b. As this occurs, inner wedge 44 pushes outwardly against the inside surface 53 of the wedge receptor outboard and inboard halves 46a and 46b, respectively. This pushes the diameter of the bar wedge device outwardly into further engagement with the inboard surfaces 45a–c of bushings 39a–c of tenons 26a–c and outboard surfaces 43a–b of bushings 37a–b of tenons 40a–b causing increased tension between the blade 14 and receiver 16.

The tension is a result of the blade being drawn inboardly via tenons 26 and device 12 and the receiver being pulled outboardly via tenons 40 and device 12. The inward tension on the blade 14, and the outward pull on the receiver 16 result in compressive loading at the base 18 of the blade 14, circumferentially onto the flange 20, and in turn into the bearing spacer 61, through the bearing assembly 32 which reacts against bearing assembly 34. Tightening of bolt 47 proceeds until the blade and receiver assembly reaches the desired preload. Accordingly, the single bar wedge device achieves the desired preload application on the bearings and blade retention/attachment simultaneously.

Figure 3:
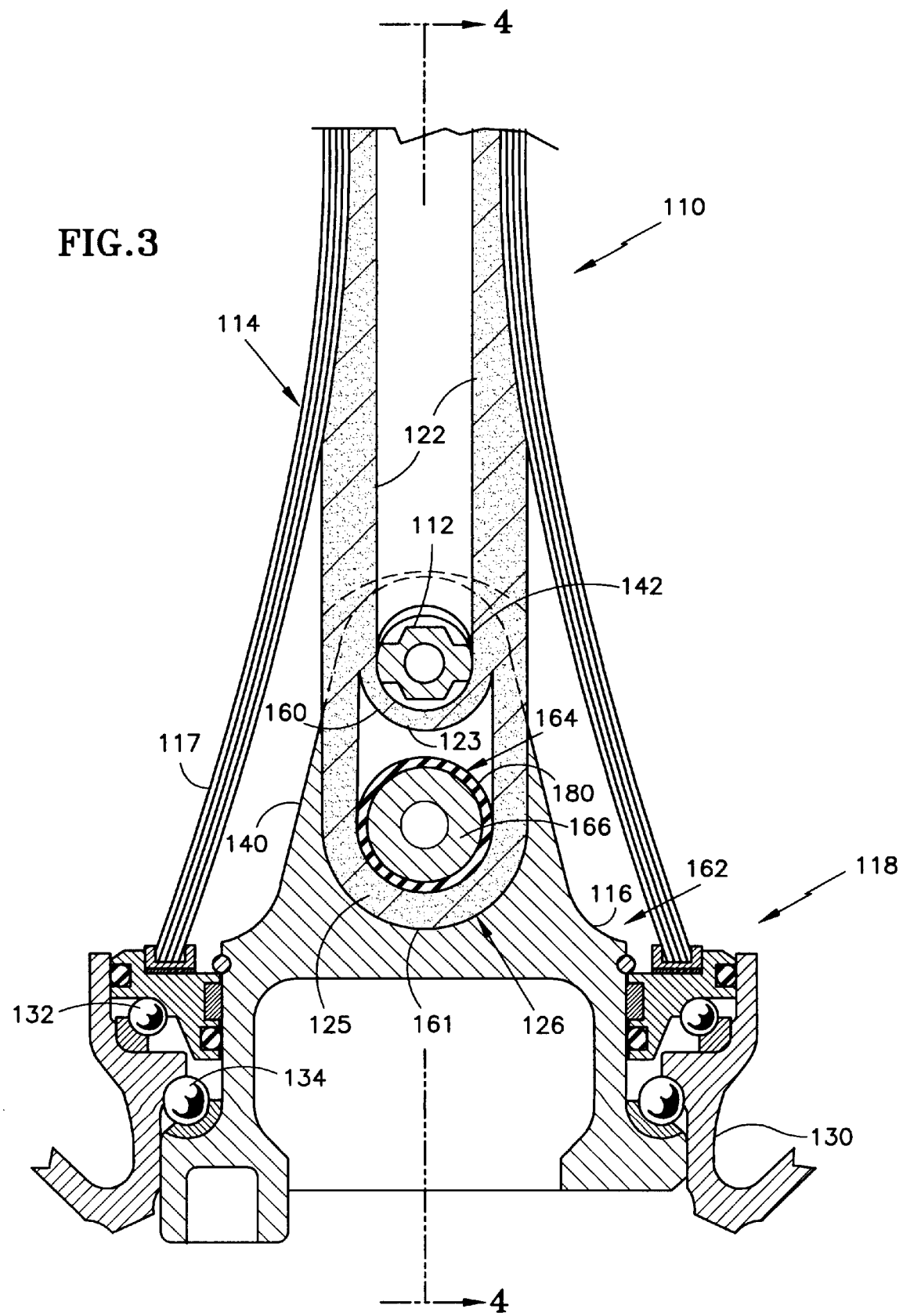
FIG. 3 is another embodiment of a bar wedge preload and retention assembly according to the principles of the present invention, which includes a bar wedge preload tool and an retention pin.

An alternative embodiment of the assembly shown in FIGS. 1, 2 and 2A is shown in FIGS. 3, 4 and 4A. In this embodiment, the bar wedge device is used as a tool for applying preload and a separate pin is used for retaining the blade to the receiver.

Referring now to FIGS. 3, 4 and 4A, elements that are similar to those discussed for the first embodiment in FIGS.

1, 2 and 2A have similar numbers. Detailed description is not given if the description above applies.

Assembly 110 includes a composite blade 114 with composite shell 117, hub arm 130 and bearings 132 and 134, and bar wedge device 112, substantially as described above. Spar 122 includes a plurality of tenons 126. However, tenons 126a–126c extend longer than those in the first embodiment. Tenons 126 include a set of openings 127a–127c that form a portion of elongated slot or opening 142 at the outboard portion 160 of root end 118 for reception of the bar wedge device 112, similar to the first embodiment. This outboard opening is formed by an abbreviated/shorter wrap 123 of spar graphite material at location 160 around opening 142 in addition to the longer wrap 125 at the inboard portion 161 of tenon 126. Inboard portion 161 of tenons 126a–126c extend further to an inboard portion 162 of root end 118 and include set of bushings 180a–180c that are fitted into a portion of second opening 164. Inboard opening 164 receives retaining pin 166. Spaces 128a and 128b separate tenons 126a–126c, as shown in FIGS. 4 and 4A, for meshing with tenons 140 extending from receiver 116.

Receiver 116 is also similar to as described in this first embodiment. It has tenons 140a and 140b extending into spaces 128a and 128b between tenons 126a–126c for meshing therewith and forming the remaining portions of outboard opening 142 and also inboard opening 164. Tenons 140 include a set of openings 141a–141b therein for assisting in forming outboard opening 142. In addition, at the inboard portion 162 of the root end 124, tenons 140a and 140b support a set of bushings 182a–182b that are fitted into inboard opening 164 with set a similar set of bushings 180a–180c in blade tenons 126 for receiving pin 166. Similar to as described above, on the outboard side 157 of outboard opening 142, bushings 137a–b are fitted into openings 141a–141b of tenons 140a and 140b, and are positioned to contact the upper half 146a, of the wedge receptor 146. Likewise, bushings 139a–c are fitted into outboard openings 127a–c of blade tenons 126 and are positioned to contact the lower half 146b of the wedge receptor 146. Accordingly, as the bar wedge device 112 is tensioned, the diameter of the outer wall 154 of the wedge receptor 146 is caused to expand, making contact with outboard surfaces 143a–b of bushings 137a–b and inboard surfaces 145a–c of bushings 139a–c, thus pulling the blade inwardly.

In assembly, shell 117 of blade 114 extends over the outwardly extending tenons 140a and 140b of receiver 116. In this manner, tenons 126a–126c intermesh with tenons 140a and 140b, as shown in FIGS. 4 and 4A. In the non-tension position, the sets of openings of tenons 140a and 140b and 126a–126c, forming inboard opening 164 are not in alignment. However, the tenon openings forming opening 142 substantially align for insertion of bar wedge device 112.

In operation, and similar to as discussed above for the FIGS. 1, 2 and 2A embodiment, bolt 147 is tightened in inner wedge 144 thereby drawing inner wedge 144 further into wedge receptor 146. As this occurs, the relative sliding motion, between the outer surface 148 of inner wedge 144 and the inner surface 153 of wedge receptor 146, cause the bar wedge device to expand diametrically. On the outboard side of opening 142, the wedge receptor comes into contact with outboard surfaces 143a–b of bushings 137a–b of tenons 140a and 140b. This pushes tenons 140a and 140b outwardly. On the inboard side of opening 142, bar wedge device comes into contact with inboard sides 145a–c of bushings 139 a–c of tenons 126a–126c of blade 114. This pushes blade 114 and spar 122 inwardly. Simultaneously, set of openings 180a–c in tenons 126a–c and set of openings 182a–b in tenons 140a and 140b, which form inboard opening 164 for pin 166, move inwardly and outwardly, respectively. Such movement occurs until the tenon openings align and a clear path forms for pin 166. With the formation of a clear path for pin 166, it is inserted and the preload position of the blade relative to the receiver 116 is thereby locked into place. The bar wedge device 112 is removed from opening 142 since it is not needed to retain the blade to the receiver. Such removal protects the more expensive and complex bar wedge device from wear that would occur during the operation of the blade. Thus, as in the description of the prior configuration, a preload is locked-in between bearing assemblies 132 and 134. This arrangement uses the less complex and less expensive pin to retain the blade. The user may replace the pin less expensively.

Figure 5:
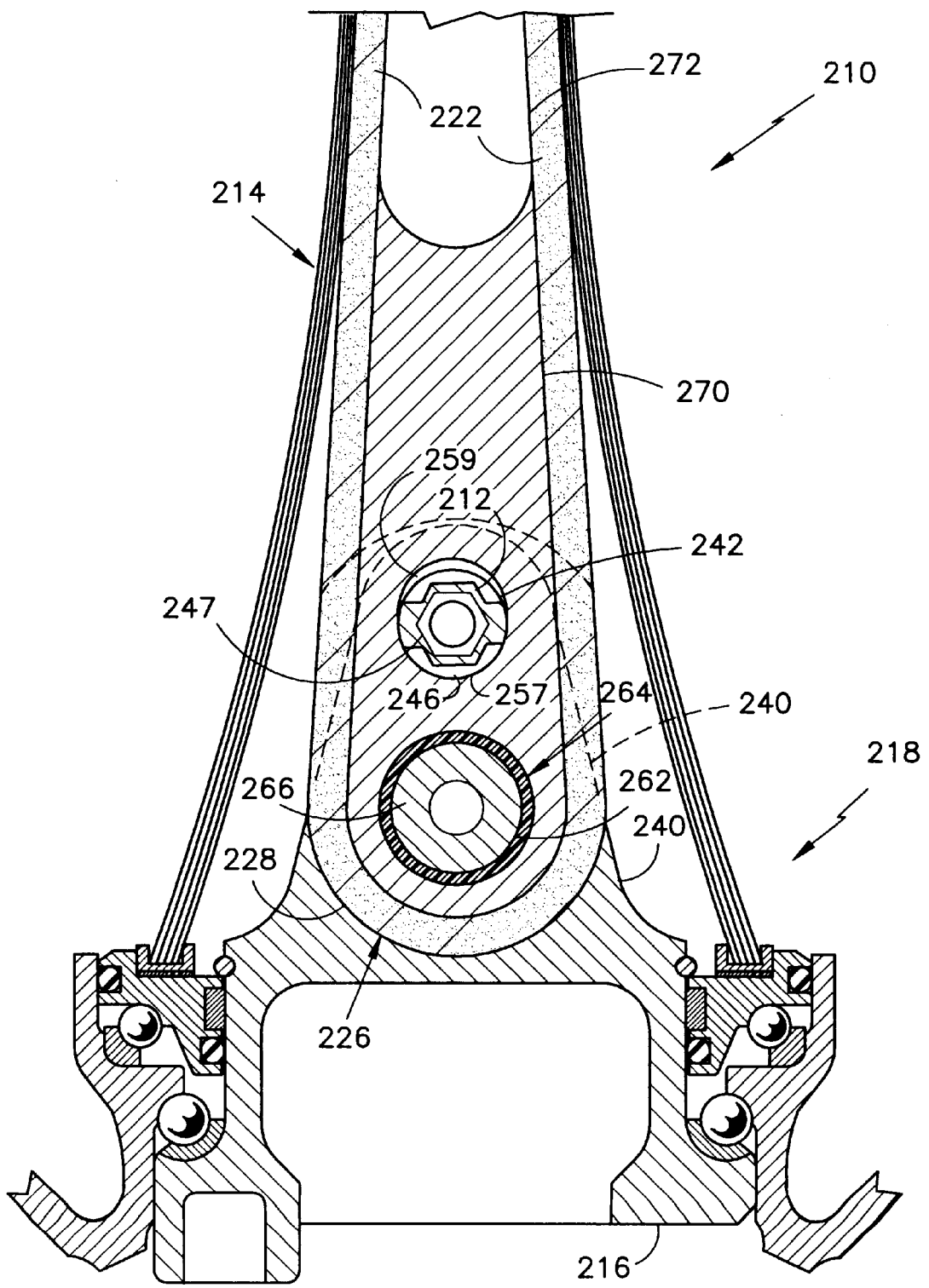
FIG. 5 is an elevational cross-sectional view of another embodiment of the assembly shown in FIG. 3 and 4.

FIG. 5 shows another embodiment of the present invention, similar to that shown in FIGS. 3, 4 and 4A, wherein the outboard opening 242 is formed partially in spar insert 270, thereby eliminating the need for shorter, separate wraps 160a–c of FIGS. 4 and 4A and 160 of FIG. 3) of spar 222 to support/transmit the preloading forces of bar wedge device 212. For assembly 210 shown in FIG. 5, the following description gives elements similar to those described for FIGS. 3, 4 and 4A similar numerical designations and gives new elements new numerical designations. Solid insert 270 fastens to the inner walls of spar 222 by known means and resides in the cavity of spar 222. Tenons 226 extend from insert 270 and assist in forming openings 242 and 264, with tenons 240, for receiving bar wedge device 212 and pin 266, respectively. The main difference between the FIG. 5, and the FIGS. 3, 4 and 4A embodiment, is the formation of the tenons 226 and its outboard set of openings in spar insert 270. Similar to the FIGS. 3, 4 and 4A embodiment, this embodiment uses a pin 266 to secure blade 214 to receiver 216. The pin extends into inboard opening 264 formed by tenons 226 extending from spar 222 and tenons 240 extending from receiver 216, similar to as described above. In addition, this embodiment uses a bar wedge device 212, similar to as described above. However, in this embodiment, tenons 240 extend into solid insert 270 within spar 222 for filling the spaces within the same. On the inboard side 257 of bar wedge device 212, the inboard surfaces of the outboard set of openings of tenons 226 are positioned closest to the inboard, outer wall of wedge receptor 246, similar to FIGS. 4 and 4A. On the outboard side 259 of bar wedge device 212, the outboard surface of the outboard set of openings of tenons 240 of receiver 216 are positioned closest to the outboard, outer wall of wedge receptor 246, also similar to FIGS. 4 and 4A. Upon tightening bar wedge device 212 via tensioning member 247, tenons 240 move in the outboard direction and tenons 226 move in the inboard direction. This tensions blade 214 with respect to receiver 216. Since solid insert 270 fastens to the inner wall of spar 222, the inboard displacement of tenons 226 of solid insert 270 is translated to blade 214, thereby tensioning the same relative receiver 216.

In assembly and operation, assembly 210 functions the same as described above for assembly 110, but in this case, with the insert 270 reacting to the preload provided by the bar wedge device 212. Accordingly, blade 214 moves into mating position with receiver 216 such that tenons 226 and 240 mesh and form openings 242 and 264 for receiving bar wedge device 212 and pin 266, respectively. The preliminary meshed position does not completely form opening 264 since the set of inboard openings in tenons 226 and 240 do not completely align. However, bar wedge device 212 inserts in opening 242. Upon tightening tensioning member 246, tenons 226 move inboardly and tenons 240 move outboardly. This movement aligns the respective inboard set of openings of the tenons for completing formation of opening 264. With these openings aligned, the desired preload is reached, and pin 266 inserts in the completed opening 264. The assembler removes the bar wedge device 212 from opening 242 and pin 266 maintains blade 214 and receiver 216 in the preloaded and engaged arrangement.

The primary advantage of this invention is that an improved pin type preload and retention assembly is provided for use with a propeller blade.

Another advantage of this invention is that a bar wedge preload and retention assembly is provided for simultaneously preloading and retaining the blade to a receiving portion of a propeller hub without the use of additional fastening means. Still another advantage of this invention is that an improved preload and retention assembly is provided which uses a bar wedge tool in combination with a pinned retention device, wherein the bar wedge tool may be removed from the propeller blade assembly after the preload is applied and the pinned retention device is secure.

Although the invention has been shown and described with respect to a best mode embodiment thereof, it should be understood by those skilled in the art that the foregoing and various other changes, omissions, and additions in the form and detail thereof may be made without departing from the spirit and scope of the invention.

What is claimed is:

1. A composite propeller blade and hub attachment assembly, comprising:
    a blade root having a first connecting member;
    a hub arm having a second connecting member, wherein said first connecting member meshingly engages said second connecting member;
    means for preloading said blade root and said hub arm, wherein said first and second connecting members form means for receiving said means for preloading, said means for preloading comprising an outer movable unit, an inner movable unit, and means for displacing said outer and inner movable units relative each other, wherein as said means for displacing relatively moves said inner and outer units, said means for preloading is caused to expand and tension said blade root and hub arm for mechanically preloading the blade.

2. A composite propeller blade and hub attachment assembly, comprising:
    a blade root having a first connecting member;
    a hub arm having a second connecting member, wherein said first connecting member meshingly engages said second connecting member;
    means for preloading said blade root and said hub arm, wherein said first and second connecting members form means for receiving said means for preloading, said means for preloading comprising an outer movable unit, an inner movable unit, and means for displacing said outer and inner movable units relative each other, wherein as said means for displacing relatively moves said inner and outer units, said means for preloading is caused to expand and tension said blade root and hub arm for mechanically preloading the blade;
    wherein said means for preloading comprises a bar wedge, and wherein said inner unit comprises an inner wedge and outer unit comprises a wedge receptor;
    wherein said inner wedge and wedge receptor surfaces extend through at least said first and second connecting members; and
    wherein as said inner wedge moves within said wedge receptor via said means for displacing, said wedge receptor is caused to expand against said first and second connecting members for preloading the blade.

3. The assembly according to claim 2, wherein said means for receiving comprises an opening for receiving said bar wedge.

4. The assembly according to claim 3, wherein said first connecting member comprises a first plurality of tenons with substantially equal spacing therebetween and wherein said second connecting member comprises a second plurality of tenons with substantially equal spacing therebetween, wherein said first plurality of tenons are offset from said second plurality of tenons such that they meshingly engage when said blade root and said hub arm are engaged.

5. The assembly according to claim 4, wherein the blade comprises an outer composite surface forming an outer surface of said blade root and defining a blade root cavity, wherein said first and second plurality of tenons are connected inside of said blade root cavity, said outer surface including an aperture for receiving said means for displacing, wherein said aperture is aligned with said means for receiving.

6. The assembly according to claim 5, wherein said opening is defined by said first and second plurality of tenons.

7. The assembly according to claim 4, wherein said opening has an inboard side and an outboard side, and wherein with said bar wedge in said opening, said first plurality of tenons extend from said blade root and are positioned to contact said bar wedge on said inboard side and wherein said second plurality of tenons are adapted to contact said bar wedge on said outboard side.

8. The assembly according to claim 2, wherein said means for displacing comprises a bolt threadably engageable with said inner wedge, wherein upon tightening said bolt said inner wedge is drawn into said wedge receptor for expanding the size of said bar wedge.

9. The assembly according to claim 2, wherein said wedge receptor comprises an outer and an inner surface, wherein said outer surface is expandable into contact with said first and second connecting members, and wherein said inner surface is tapered defining a tapered cavity for receiving said inner wedge.

10. The assembly according to claim 9, wherein said wedge receptor further comprises means for receiving said means for displacing.

11. The assembly according to claim 2, wherein said bar wedge has a longitudinal axis, said inner wedge has an outer surface and said wedge receptor has an inner surface, and wherein said outer surface is sloped at a first angle relative said longitudinal axis and said inner surface is sloped at a second angle relative said longitudinal axis, said first and second angles being substantially equal.

12. A composite propeller blade and hub attachment assembly, comprising:
    a blade root having a first connecting member and a first tool receiving member;
    a hub arm having a second connecting member and a second tool receiving member, wherein said first connecting member engages said second connecting member and wherein said first tool receiving member engages said second tool receiving member;
    means for preloading said blade root and said hub arm, wherein said first and second tool receiving members form means for receiving said means for preloading, said means for preloading comprising an outer movable unit, an inner movable unit, and means for displacing said outer and inner movable units relative each other;

means for securing said blade root to said hub arm independent of said means for preloading such that said means for preloading is removable for operation of the blade, wherein as said means for displacing relatively moves said inner and outer units said means for preloading is caused to expand and tension said blade root and said hub arm for centrifugally preloading the blade.

13. The assembly according to claim 12, wherein said means for preloading comprises a bar wedge, and wherein said inner unit comprises an inner wedge and said outer unit comprises a wedge receptor, wherein as said inner wedge moves within said wedge receptor via said means for displacing, said wedge receptor is caused to expand against said first and second connecting members for preloading the blade.

14. The assembly according to claim 13, wherein said means for receiving comprises an opening for receiving said bar wedge.

15. The assembly according to claim 13, wherein said first tool receiving member comprises a first set of openings in a first plurality of tenons with substantially equal spacing therebetween and wherein said second tool receiving member comprises second set of openings in a second plurality of tenons with substantially equal spacing therebetween, wherein said first plurality of tenons are offset from said second plurality of tenons such that they meshingly engage and said first and second set of openings form said means for receiving when said blade root and said hub arm are engaged.

16. The assembly according to claim 15, wherein said first connecting member comprises a third set of openings in said first plurality of tenons and wherein said second connecting member comprises a fourth set of openings in said second plurality of tenons, said fourth set of openings adapted to align for receiving said means for securing.

17. The assembly according to claim 16, wherein said means for securing comprises a pin positioned through said third and fourth set of openings.

18. The assembly according to claim 16, wherein said blade root has an outboard end and an inboard end, wherein said first and second set of openings are meshingly engaged nearest said inboard end and said third and fourth set of openings are meshingly engaged nearest said outboard end.

19. The assembly according to claim 15, wherein the blade comprises an outer composite surface forming an outer surface of said blade root and defining a blade root cavity, wherein said first and second plurality of tenons are connected with said blade root inside of said blade root cavity, said outer surface including an aperture for receiving said means for displacing, wherein said aperture is aligned with said means for receiving.

20. The assembly according to claim 19, wherein said means for receiving comprises a slot defined by said first and second sets of openings.

21. The assembly according to claim 15, wherein said opening has an inboard side and an outboard side, and wherein with said bar wedge in said opening, said first set of openings extend, in said first plurality of tenons, from said blade root and are closer to contact with said bar wedge on said inboard side than said second set of openings and wherein said second set of openings extend, in said second plurality of tenons, from said hub arm and are positioned closer to contact with said bar wedge on said outboard side than said first set of openings.

22. The assembly according to claim 13, wherein said means for displacing comprises a bolt threadably engageable with said inner wedge, wherein upon tightening said bolt said inner wedge is drawn into said wedge receptor for expanding the size of said bar wedge.

23. The assembly according to claim 22, wherein said wedge receptor comprises an outer and an inner surface, wherein said outer surface is expandable into contact with said first and second tool receiving members, and wherein said inner surface is tapered defining a tapered cavity for receiving said inner wedge.

24. The assembly according to claim 23, wherein said wedge receptor further comprise means for receiving said means for displacing.

25. The assembly according to claim 13, wherein said bar wedge has a longitudinal axis, said inner wedge has an outer surface and said wedge receptor has an inner surface, and wherein said outer surface is sloped at a first angle relative said longitudinal axis and said inner surface is sloped at a second angle, wherein said first and second angles are substantially complimentary.

* * * * *